April 18, 1961   J. CAMPBELL, JR   2,980,179
CYCLONE EVAPORATOR FOR RESIDUAL LIQUOR
Filed June 25, 1954   2 Sheets-Sheet 1
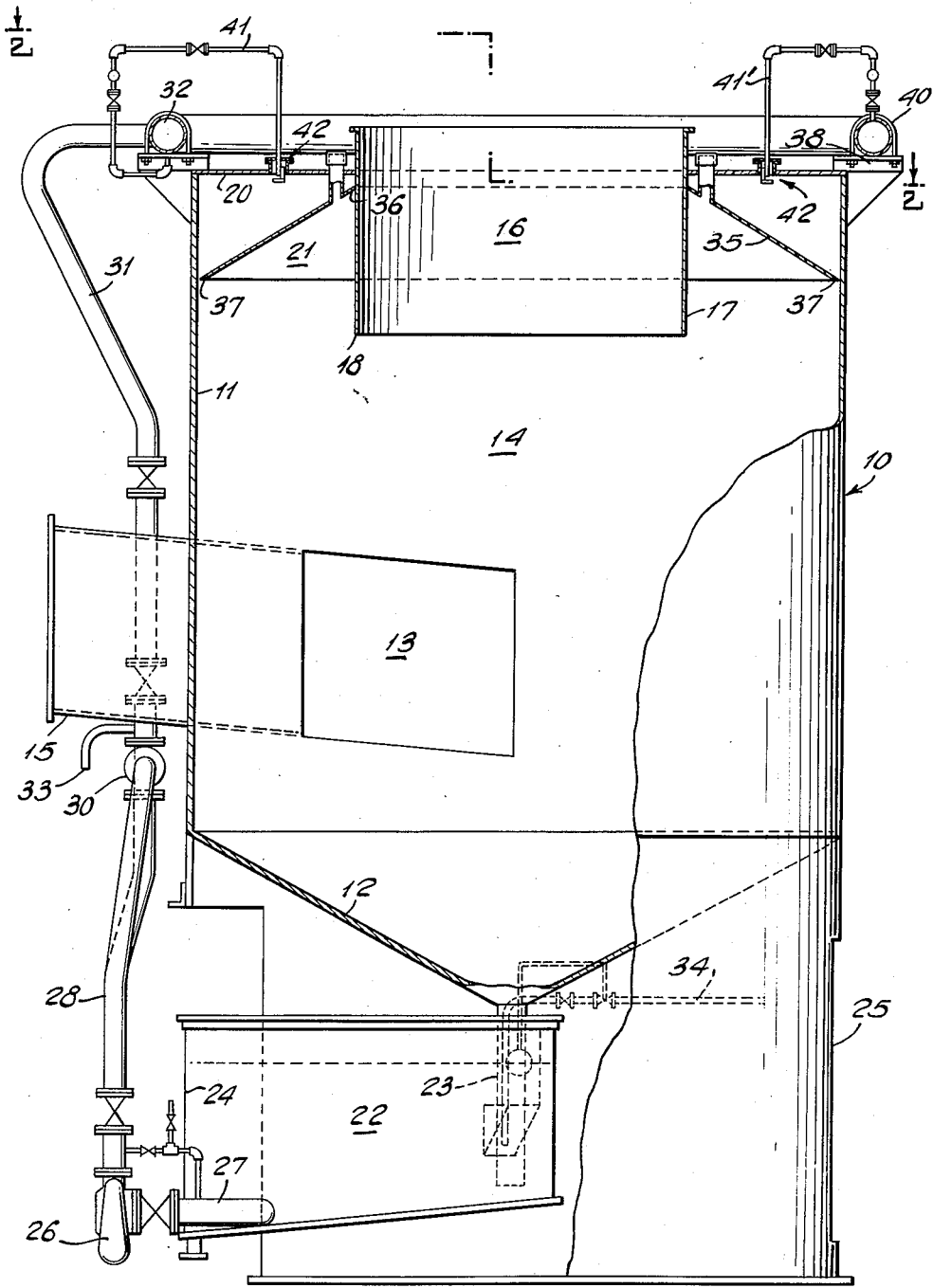
INVENTOR
JOHN CAMPBELL JR.
BY
ATTORNEY April 18, 1961     J. CAMPBELL, JR     2,980,179
CYCLONE EVAPORATOR FOR RESIDUAL LIQUOR
Filed June 25, 1954     2 Sheets-Sheet 2
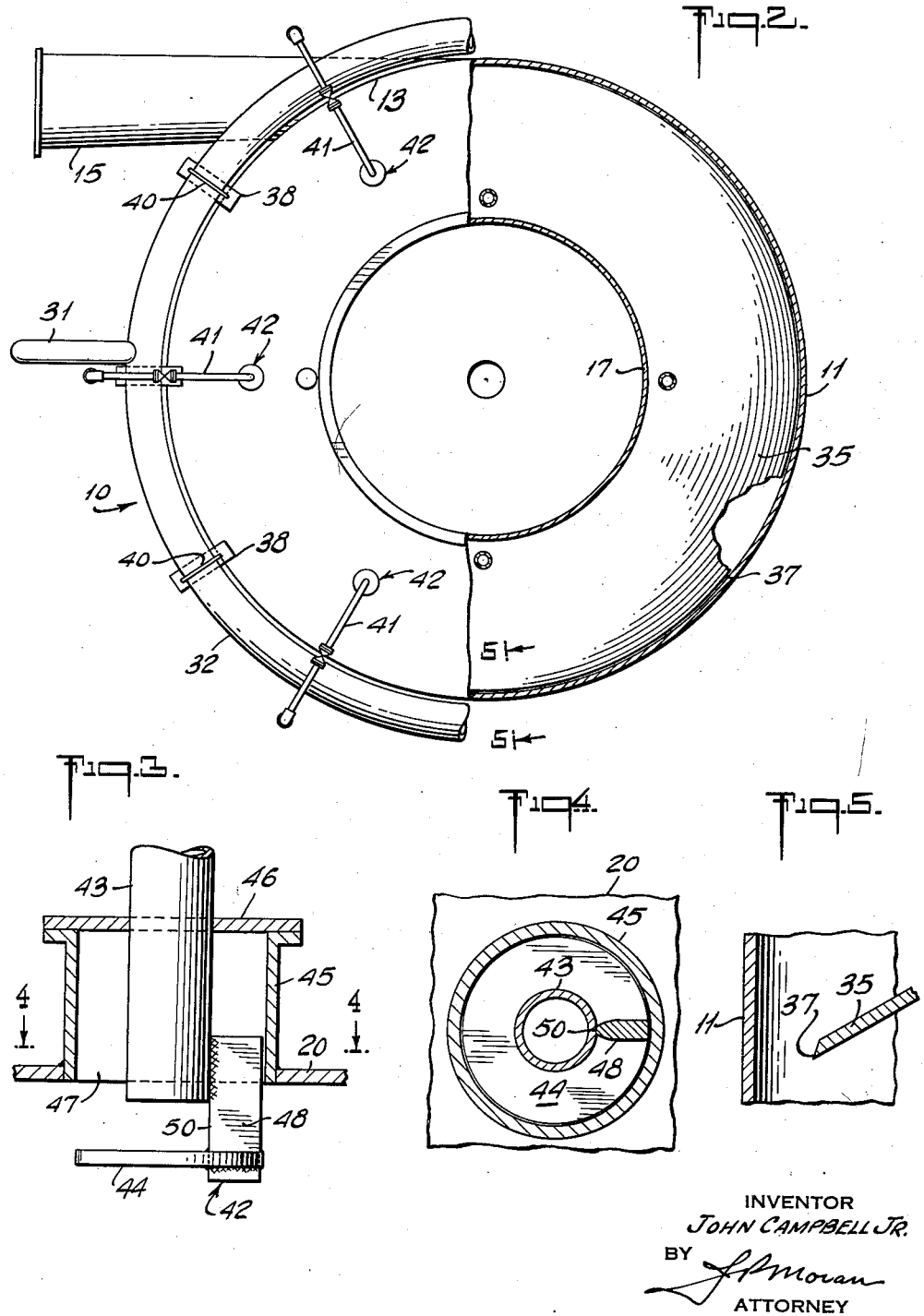
INVENTOR
JOHN CAMPBELL JR.
BY
ATTORNEY

United States Patent Office 2,980,179
Patented Apr. 18, 1961

2,980,179

CYCLONE EVAPORATOR FOR RESIDUAL LIQUOR

John Campbell, Jr., Massapequa Park, N.Y., assignor to The Babcock & Wilcox Company, New York, N.Y., a corporation of New Jersey Filed June 25, 1954, Ser. No. 439,183

2 Claims. (Cl. 159—4)

The present invention relates to apparatus for the recovery of chemicals and heat from the flue gases discharged from a chemical recovery unit in which residual liquor is incinerated. More particularly the invention relates to improvements in cyclone evaporators of the type disclosed in the Tomlinson et al. U.S. Patent 2,590,905.

In the recovery of chemicals from residual pulping process liquor containing inorganic chemicals and combustible organic matter, such as, for example, black liquor of the sulphate process of manufacturing paper pulp, the liquor is concentrated by evaporation to a solid concentration of 45 to 70 percent and its combustible constituents burned in a furnace to recover the included inorganic chemicals and to generate heat for absorption in an associated heat exchange apparatus. The heat absorptive surface installed in the unit is customarily limited by economic factors to a recovery of the relatively high temperature potential heat in the combustion gases. As a result, the temperature of the flue gases leaving the usual sulphate process chemical and heat recovery unit will be in the range of 400 to 600° F. and contains a substantial amount of low potential heat.

Heretofore, it has been customary to utilize some of the sensible heat in the flue gases to concentrate the residual liquor prior to its incineration. This is accomplished by direct contact heat exchange between the flue gases and partially concentrated residual liquor in a spray tower or a disc evaporator, or more recently by the cyclone evaporator disclosed in the Tomlinson et al. patent. The thermal efficiency of the recovery process is substantially improved by the heat recovery resulting from the direct contact of hot flue gases with the residual liquor, effecting a saving in the amount of steam used in the multiple effect evaporators to attain an equivalent solid content of the liquor delivered to the furnace.

While the primary advantage of the direct contact between the hot flue gases and the residual liquor lies in the thermal recovery due to concentrating the liquor prior to its incineration, the contact therebetween also leads to at least a partial removal of entrained solids in the gases, resulting in a chemical saving to the process.

The apparatus in use prior to the cyclone evaporator was troubled by excessive carry over of black liquor spray droplets which upon contact with unwashed surfaces, away from the liquor stream, results in plugging of the unit and the connecting ducts. This necessitated frequent shut-down of the equipment for the removal of such deposits. Particles of liquor that are not deposited on the walls of the equipment and which escape to the atmosphere with the flue gas stream, not only represent a substantial chemical loss but also create a serious industrial nuisance.

As is disclosed in the Tomlinson et al. patent, the problem of black liquor entrainment in the flue gases leaving a direct contact evaporator can be solved by passing the gases through a cyclonic separating zone which may be combined with the evaporator to form a cyclonic type evaporator. In such a vessel a stream of flue gas is tangentially introduced and passed at a relatively high velocity through a helical path in intimate scrubbing contact with boundary walls continuously wetted with liquid to form a descending liquid film on the walls of the vessel. The centrifugal effect of the rotating gas stream in contact with the wetted wall surface is prolonged for a period sufficient for a substantial portion of the coarse solid matter entrained with the gases to be deposited in the wet film on the boundary walls before the gases are discharged from the evaporator. The intimate contact between the hot gases and the liquor film on the walls of the evaporator results in the evaporation of a portion of the water contained in the liquor.

As pointed out in said Tomlinson et al. patent, the residual liquor is sometimes oxidized, prior to concentration, to stabilize the sulphur compounds therein. When the sulphur compounds in the liquor are in a stabilized condition the hot flue gases can be cooled to their dew point temperature in the direct contact evaporator without the formation of corrosive acids in the condensate. However, when the sulphur compounds in the liquor have not been stabilized it is desirable to maintain the temperature of the gases leaving the evaporator safely above the dew point temperature so as to avoid the formation of corrosive acids in the condensates from the flue gas. The cooling effect of the liquor on the flue gas is largely dependent upon the amount of liquor passed through the evaporator and in contact with the gas.

Reducing the amount of liquor in contact with the gas can be accomplished by reducing or entirely eliminating the liquor sprayed into and entrained by the entering hot gases. Reduction in the amount of liquor passed along the walls of the cyclone evaporator, however, has only a mnior effect on heat exchange between liquor and gas. Reducing the amount of wall wetting liquor reduces the thickness of the liquor film on the wall of the evaporator. The smaller the quantity of wall wetting or washing liquor used, the less interference there is with the cyclonic action of the gases and the less likelihood there is of liquor droplet carry over due to entrainment by the exit gas. However, a reduction in the amount of liquor delivered to the walls of the cyclone evaporator increases the need for a uniform delivery of liquor to all circumferential portions of the walls.

In accordance with the present invention, I provide improved means for distributing liquor to the walls of a cyclone evaporator so that a thin film of substantially uniform thickness of downwardly moving liquor is formed. This is accomplished by the installation of a frusto-conical baffle in the upper portion of the evaporator with the lower edge of the baffle ending adjacent the upright cylindrical wall of the evaporator body. A plurality of wide angle spray nozzles are positioned in the annular space bounded by the baffle, the cylindrical wall and the cover plate of the evaporator body. The nozzles project a spray of atomized liquor in a generally horizontal plane through an angle of substantially 360°. The novel arrangement of the liquor spray nozzles and the frusto-conical baffle permits the formation of a thin film of liquor upon the cyclone wall without splashing in the area of gas contact and thereby prevents liquor carry over in the gases leaving the evaporator body.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described an embodiment of my invention.

Of the drawings:

Fig. 1 is an elevation, partly in section, of a cyclone evaporator constructed in accordance with the present invention;

Fig. 2 is a plan and horizontal section of the evaporator taken on the line 2—2 of Fig. 1;

Fig. 3 is an enlarged elevation, in section, of a nozzle shown in Fig. 1;

Fig. 4 is a horizontal section taken on the line 4—4 of Fig. 3; and

Fig. 5 is an enlarged elevation, in section, of another portion of the apparatus shown in Fig. 1.

While the present invention is illustrated and described in connection with a cyclone evaporator wherein a thin film of liquor is passed along the walls of the evaporator and as a result the flue gases leaving the evaporator are maintained substantially carry-over free, it will be understood the wall wetting means of the invention is equally applicable to evaporator units wherein large quantities of liquor are passed along the wall of the evaporator in contact with the hot gases passing therethrough. Under either condition, additional liquor may be sprayed into the hot gas stream entering the evaporator, if desired, as for example, in the manner disclosed in said Tomlinson et al. patent.

As shown in the drawings, the evaporating and separating apparatus, or cyclone evaporator 10 consists of a cylindrical body 11 provided with an inverted conical bottom 12 and a tangential gas inlet 13 positioned in the lower portion of the chamber 14 formed by the cylindrical body 11. Hot flue gases resulting from the incineration of a concentrated residual liquor passes through a duct 15 to enter the evaporator 10 at a relatively high velocity. Thereafter, the gases flow upwardly along the cylindrical wall of the evaporator body 11 in a helical path. A flue gas outlet 16 from the evaporator chamber is centrally located and defined by a vertical duct 17 having its open lower end 18 at a level spaced below the top plate 20 of the chamber. With this construction, at least some of the flue gases make a complete change in direction of flow in the annular space 21 surrounding the lower end 18 of the duct 17 before the gases exit from the chamber 14.

A tank 22 is connected to the bottom 12 of the evaporator chamber 14 by a pipe 23 so that liquor running down the walls of the evaporator chamber will collect in the tank 22 without forming a pool in the lower portion of chamber 14. The tank 22 is defined by a cylindrical wall 24 conveniently enclosed in a lower extension 25 of the walls defining the evaporator chamber.

A pair of liquor pumps 26 (one shown) are arranged for alternate service for withdrawing concentrated liquor from the tank 22 through individually valved inlet pipe connections 27. The discharge pipe 28 from each of the pumps are joined in a Y connection 30 for common discharge through a valved pipe 31 opening to an upper liquor manifold 32 positioned adjacent the top plate 20 of the evaporator chamber 14. The pipe 31 is also provided with an offtake connection 33 for delivery of concentrated liquor to the incinerating furnace (not shown). Partially concentrated residual liquor is delivered to the evaporator 10 from multiple effect evaporators (not shown) at a concentration of the order of 45% solids, through a valved pipe 34 opening to the tank.

As disclosed in said Tomlinson et al. patent, the evaporator 10 may be provided with a plurality of spray nozzles positioned in the gas inlet duct 15 and arranged to receive either concentrated residual liquor from the tank 22 or partially concentrated liquor from the pipe 34.

As shown in Figs. 1 and 2, a frusto-conical skirt 35 is installed in the upper portion of the cyclone evaporator. The upper circumferential edge 36 of the skirt 35 is welded to the central gas outlet duct 17 while the lower circumferential edge 37 extends to a position closely spaced inwardly of the circumferential wall 11 of the evaporator 10. The lower circumferential edge 37 of the skirt is chamfered (see Fig. 5) to provide a relatively sharp edge portion to the skirt 35 extending toward the circumferential wall 11 of the evaporator. In the illustrated embodiment of the invention the cyclone evaporator 10 is approximately 16′ in diameter and the spacing between the inner surface of the wall 11 of the evaporator 10 and the circumferential edge 37 of the skirt 35 is approximately 1″.

The concentrated liquor discharged by the pumps 26 through the pipe 31 is delivered to the manifold 32 which is of circular axial configuration, and is mounted upon the top plate 20 of the cyclone evaporator by means of brackets 38 and U bolts 40. The axial configuration of the manifold 32 is of slightly greater diameter than that of the evaporator 10 and is provided with a plurality of valved branch pipes 41 each of which connects with a corresponding spray nozzle 42, hereinafter described. In the embodiment of the invention shown in Figs. 1 and 2, six circumferentially equally spaced nozzles 42 project downwardly through the top of the cyclone evaporator 10. Five circumferentially equally spaced branch pipes 41 lead from the bottom of the manifold 32 in a substantially 360° turn around the exterior of the manifold to discharge into the corresponding spray nozzles 42. A sixth branch pipe 41′ connects the upper side of the manifold 32 with one of the nozzles 42. The branch pipe 41′ is connected with the top of the manifold 32 for the removal of vapors and gases from the manifold. Each of the branch connections is individually provided with a pair of flow-control valves between which is located a branch pipe for the admission of steam to the pipe system for cleaning purposes, when cleaning of the system is desirable.

The nozzles 42 of the present invention are shown at an enlarged scale in Figs. 3 and 4. As shown, each nozzle comprises an open ended pipe 43 welded to a circular plate 44 which is disposed at right angles to the bore of the pipe and spaced from the open end thereof. The nozzle is in turn secured to a hollow cap member. The cap members are each constructed from a short section of pipe or tube 45 with a plate top 46, and welded into an opening 47 in the top plate 20 of the evaporator chamber 14. The tube 43 projects downwardly through the opening 47 to a position spaced below the inner surface of the top plate 20. Welded to one side of the nozzle is a strut 48 which serves to support and position the horizontally disposed circular plate 44 which is positioned with its center in vertical alignment with the vertical axis of the tube 43 of the nozzle 42. The strut is shaped with its edge adjacent the tube 43 having a pointed edge 50. The purpose of this construction is to allow substantially 360° distribution of the liquor spray discharged from the surface of the plate 44.

In the operation of the spray nozzles 42, liquor is projected in spray form in a generally horizontal plane to impact the upper surface of the frusto-conical skirt 35 and the inner circumferential surface of the evaporator wall 11. There is a certain amount of liquor spray overlapping from adjacent nozzles 42 on the intercepting surfaces of the skirt 35 and wall 11. The liquor spray deposited upon the inner circumferential surface of the evaporator wall forms a film thereon which moves downwardly along the wall under the influence of gravity. The liquid spray particles contacting the frusto-conical skirt 35 form a film of liquor thereon which likewise gravitates downwardly toward the chamfered edge 37 of the skirt 35. Liquor flows downwardly over the edge 37 of the skirt and the circular movement of the hot gases rising within the chamber throws the liquor outwardly against the boundary wall 11.

The 16 foot diameter cyclone evaporator described is suitable for use in the heat and chemical recovery system having a kraft pump capacity of the order of 250 tons per day. In such an installation approximately 250,000 pounds of flue gas per hour, at a temperature, of for example 500° F. will be delivered to the cyclone evaporator. The flue gases will leave the evaporator at a temperature of approximately 300° F. when concentrating the liquor to a solids content of approximately 65%.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. Gas and liquid contact apparatus comprising a cylindrically walled main chamber having a liquor outlet in the lower part thereof, a centrally located gas outlet duct projecting downwardly into the upper end of said chamber, an upright frusto-conical member surrounding said gas outlet duct and having its lower periphery spaced inwardly from and adjacent to the circumferential wall of said main chamber to define a narrow annular passage therebetween, said frusto-conical member cooperating with said circumferential wall to define therebetween a liquid spray chamber and with said gas outlet duct to define therebetween an annular gas turning space extending above the level of said narrow annular passage, spray means in said liquor spray chamber arranged to discharge a liquid directly onto the outer surface of said frusto-conical member and thence downwardly through said narrow annular pasage to form a downwardly moving film of liquor on the subjacent portion of said circumferential wall, and a tangentially arranged gas inlet duct positioned in the lower portion of said circumferential wall for the introduction of hot gas into said main chamber.

2. Apparatus for the treatment of a liquor containing chemical solids comprising a cylindrically walled substantially unobstructed main chamber having a liquor outlet in the lower part thereof, a centrally located gas outlet duct projecting downwardly into the upper end of said chamber, an upright frusto-conical member surrounding said gas outlet duct and having its lower periphery spaced inwardly from and adjacent to the circumferential wall of said main chamber to define a narrow annular passage therebetween, said frusto-conical member cooperating with said circumferential wall to define therebetween a liquid spray chamber and with said gas outlet duct to define therebetween an annular gas turning space extending above the level of said narrow annular passage, spray means in said liquor spray chamber arranged to discharge solids laden liquid horizontally and directly onto said circumferential wall and the outer surface of said frusto-conical member and thence downwardly through said narrow annular passage to form a downwardly moving film of liquor on the subjacent portion of said circumferential wall, and a tangentially arranged gas inlet duct positioned in the lower portion of said circumferential wall for the introduction of hot gas into said main chamber.

References Cited in the file of this patent
UNITED STATES PATENTS

| | | |
|---|---|---|
| 678,451 | Allington | July 16, 1901 |
| 910,074 | Logan | Jan. 19, 1909 |
| 1,253,234 | Haas | Jan. 15, 1918 |
| 1,401,176 | Miller et al. | Dec. 27, 1921 |
| 1,868,632 | Edge | July 26, 1932 |
| 2,529,045 | Ortgies | Nov. 7, 1950 |
| 2,578,315 | Parker | Dec. 11, 1951 |
| 2,590,905 | Tomlinson et al. | Apr. 1, 1952 |